(12) United States Patent
Fahlander (10) Patent No.: US 8,922,488 B2
(45) Date of Patent: Dec. 30, 2014

(54) PEN MOUSE

(75) Inventor: Johan Fahlander, Lidingö (SE)

(73) Assignee: Gylling Invest AB, Danderyd (SE)

( * ) Notice: Subject to any disclaimer, the term of this patent is extended or adjusted under 35 U.S.C. 154(b) by 2268 days.

(21) Appl. No.: 11/631,297

(22) PCT Filed: Jul. 8, 2005

(86) PCT No.: PCT/EP2005/007380
§ 371 (c)(1),
(2), (4) Date: Jan. 3, 2008

(87) PCT Pub. No.: WO2006/005523
PCT Pub. Date: Jan. 19, 2006

(65) Prior Publication Data
US 2008/0225003 A1    Sep. 18, 2008

(30) Foreign Application Priority Data
Jul. 9, 2004   (EP) .................... 04016162

(51) Int. Cl.
*G06F 3/033*   (2013.01)
*G05G 9/047*   (2006.01)
*G06F 3/0338*  (2013.01)
*G06F 3/0354*  (2013.01)

(52) U.S. Cl.
CPC .............. *G05G 9/047* (2013.01); *G06F 3/0338* (2013.01); *G06F 3/03545* (2013.01); *G06F 3/03546* (2013.01)
USPC ......................................................... 345/163

(58) Field of Classification Search
USPC ......................................... 345/161, 163–166
See application file for complete search history.

(56) References Cited

U.S. PATENT DOCUMENTS

| | | | |
|---|---|---|---|
| 3,462,548 A | 8/1969 | Rinder | |
| 4,733,214 A | 3/1988 | Andresen | |

(Continued)

FOREIGN PATENT DOCUMENTS

| | | |
|---|---|---|
| JP | 3007777 | 12/1994 |
| JP | 10-187329 | 7/1998 |

(Continued)

OTHER PUBLICATIONS

International Search Report (PCT/ISA/210), Sep. 9, 2005.

(Continued)

*Primary Examiner* — Abbas Abdulselam
(74) *Attorney, Agent, or Firm* — Harness, Dickey & Pierce, P.L.C.

(57) ABSTRACT

A computer input device is disclosed, including a base element arranged for resting on a surface, detecting device for detecting movement of the base element relative to the surface, communication device for communicating information about the movement to a computer, and a grip element connected to the base element in the direction of a connection axis. The base element is provided with a recess, and the grip element extends into the recess, where it is pivotably arranged relative to the base element and where it is prevented from rotating relative to the base element round its connection axis. There is also disclosed a base element, arranged for resting on a surface and connectable to a grip element to form a computer input device in conjunction therewith. The base element is provided with a recess adapted for receiving the grip element pivotably therein such that the grip element is prevented from rotating relative to the base element round a connection axis thereof.

36 Claims, 7 Drawing Sheets

(56) References Cited

U.S. PATENT DOCUMENTS

| | | | |
|---|---|---|---|
| 4,780,707 A * | 10/1988 | Selker | 345/163 |
| 5,790,101 A * | 8/1998 | Schoch et al. | 345/161 |
| 5,805,143 A | 9/1998 | Myers | |
| 5,999,170 A | 12/1999 | Ooura et al. | |
| 6,040,758 A * | 3/2000 | Sedor et al. | 338/197 |
| 6,377,239 B1 * | 4/2002 | Isikawa | 345/156 |
| 6,795,057 B2 * | 9/2004 | Gordon | 345/163 |
| 6,992,602 B2 * | 1/2006 | Alexander et al. | 341/22 |

FOREIGN PATENT DOCUMENTS

| | | |
|---|---|---|
| JP | 10-269017 | 10/1998 |
| SE | 521 526 | 11/2003 |
| WO | 2001/001233 | 1/2001 |
| WO | 2001/079954 | 10/2001 |

OTHER PUBLICATIONS

Japanese Office Action, Jun. 9, 2009.
Ullman Technology AB, "Ullman PenClic Mouse User's Guide," pp. 1-31, Jul. 2002.
English translation of Japanese Office Action dated Oct. 22, 2010.
Preliminary Opinion dated Apr. 15, 2011 for EP Patent Application No. 04 016 162.2.
Notice of Opposition to a European Patent for EP Patent Application No. 04 016 162.2 (EP 1 615 096). Jun. 7, 2010.
P. Patton, "New Mouse Takes Shoulder Off Wheel." New York Times, Technology. Apr. 12, 2001.
Webster's New $20^{th}$ Century Dictionary, $2^{nd}$ Ed. 1975.
Press Release, CeBIT Hall 11 D24 Goteborg, Mar. 12, 2002.
Johan Ulman et al, "A New Approach to the Mouse Arm Syndrome"—International Journal of Occupational Safety and Ergonomics (JOSE) 2003, vol. 9, No. 4, pp. 463-477.
Ullman PenClic Mouse User Guide (Jul. 2002).
Ullman PenClic Mouse photographs. No date provided.
P. Wendel, "The Invention Relieves You of Mouse Elbow." Expressen, Headline page and p. 11. Apr. 24, 2001.
Summons to Attend Oral Proceedings dated Mar. 12, 2012 for EP Patent Application No. 04 016 162.2.
Annex to Summons to Attend Oral Proceedings dated Mar. 12, 2012 for EP Patent Application No. 04 016 162.2.
Affidavit of Dr. Johan Magnus Ullman dated Oct. 14, 2011 for EP Patent Application No. 04 016 162.2.
Affidavit of Mr. Fredrik Granlund dated Oct. 18, 2011 for EP Patent Application No. 04 016 162.2.
Technical Drawing of Ullman Mouse from 2001 attached to Summons to Attend Oral Proceedings for EP Patent Application No. 04 016 162.2.

\* cited by examiner

PEN MOUSE

TECHNICAL FIELD OF THE INVENTION

The present invention relates to a computer input device including a base element having a housing and being arranged for resting on a surface, detecting means for detecting movement of the base element relative to the surface, communication means for communicating information about the movement to a computer and a grip element.

BACKGROUND ART

There exist several different kinds of computer input devices. One kind is a conventional computer mouse. A computer mouse is placed on a support pad. When the mouse is moved over the support pad, the relative movement is detected and transmitted to the computer. Such a mouse is also often equipped with click buttons and a scroll wheel. A problem with this type of input device is that long-time use causes static stress on the fore arm muscles which may lead to stress injuries.

Another kind of computer input devices are so called joysticks. Instead of detecting the relative movement between the computer device and the support pad as with a computer mouse, with a joystick the inclination of a handle is detected and transmitted to the computer. Also a joystick may include buttons or the like for additional functions. One drawback with such a device is that most people experience difficulties to manoeuvre a joystick an high precision applications.

Another known input device, which functions in the same way as a conventional computer mouse and has, relative a joystick, improved precision properties, is a pen-shaped computer mouse. Drawbacks with pen mice are that they are only operable under a limited range of inclinations, which has proven difficult for a normal user to maintain. Consequently, there may be gaps in the stream of information transmitted to the computer. Furthermore, a pen mouse must be moved without rotating it in order to maintain the reference directions. If, for example the pen mouse is rotated 90°, an original longitudinal direction will be interpreted as lateral. Furthermore, a pen mouse has to be repeatedly put down and picked up during normal computer work including operating a keyboard. If the pen mouse is of a wireless type, it may in addition easily get lost on a desk.

A solution to these problems has been presented in WO 01/01233. In the document a computer input device of the kind mentioned in the first paragraph is known. This known device is arranged for wireless transmittal of information regarding the movement of a support element relative to a support pad to a receiving unit. A protrusion is provided on the support element comprising a torsionally rigid, elastic joint. A pen shaped arrangement is connectable to the joint. The support element is designed to be controlled by the pen shaped arrangement. A problem with this known device is that the user experiences insufficient precision. Further, although the known input device constitutes an improvement over conventional input devices, the device is not ergonomically optimal.

SUMMARY OF THE INVENTION

It is therefore an object of the present invention to provide a computer input device of the kind mentioned in the first paragraph having improved precision and ergonomic characteristics compared with the device known from WO 01/01233.

This object is achieved with a device described herein.

Consequently, in accordance with a first aspect thereof, the invention is directed to a computer input device.

In accordance with a second aspect thereof, the invention is directed to a base element being arranged to form together with a grip element a computer input device.

The invention relates to computer input devices intended to be moved over a support surface while contacting the surface. The device may slide, roll or move in any other way having contact with the surface. This is per se known to the person skilled in the art.

The surface usually is a desk or a support pad, but any suitable surface may be used.

Detecting means are provided in the input device which are able to detect the movement of the device relative to the surface as the device is moved over the surface. The detecting means may be physical or optical detecting means having physical and optical contact, respectively, with the support surface. Normally, the detecting means are situated in a part of the input device that faces the support surface during normal use.

Furthermore, the computer input device includes communication means. As the detecting means detect relative movement, information about this movement is transmitted from the detecting means to the communication means. The communication means communicates the information to a computer in any conventional manner, for example by an electrical wire or by wireless transmittal, for example optical transmission.

Furthermore, the computer input device may include an energy source such as a voltage source, for example batteries. However, the use of electric mains is also included in the scope of protection of the present invention.

The computer input device may also be provided with lick buttons, scroll wheels or the like in order to offer additional conventional and possible new functions.

The detecting means, the communication means, the lick buttons, the scroll wheels and their operation and energy supply belong to the state of the art.

The computer input device according to the invention additionally includes a base element and a grip element connected with the base element. The movements of the base element are controllable by the grip element.

The base element is moved over the surface by a user holding the grip element and exerting a force on the grip element which force is transmitted to the base element at the point of connection of the grip element and the base element. It has been discovered that the user will experience more precision the closer said point of connection is to the support surface. The operation of the computer input device will be manageable with less effort due to the improved precision. Consequently, the ergonomics of the computer device is also improved with a low connection point.

However, the base element must be at least so bulky constructed that it offers sufficient support to the grip element. Optionally, it also houses electronic and optical equipment or relatively space-requiring batteries, which places constructive size demands on the base element.

According to the invention, there is provided a base element having a recess in which the grip element is received. Thereby, a device is achieved that is large enough to house the necessary equipment, and that, at the same time, provides a connection point close to the support surface.

The term "recess" is to be widely interpreted so as to describe an external, set back part of the base element. Accordingly, the recess may constitute a countersink in a surface of the base element. The recess may also constitute a surface or a part set back closer to the support surface than other surfaces or parts of the base element during normal use. Normally, the area of the recess is a minor part of the external of the base element such that, in use, the mayor part of the upper surface of the base element will be located further away from the support surface.

The grip element is connected with the base element in the direction of a connection axis. In order to allow the user a comfortable operating position, the grip element is pivotably connected to the base element. The grip element is arranged to be pivotable round an axis lying in a plane normal to the present direction of the connection axis. The grip element is prevented from rotating round its connection axis, in order to accurately transmit the applied forces to the base element. The prohibited rotation round the connection axis is also necessary for maintaining, in the plane of the support surface, correct angular reference between the grip element and the base element, thereby avoiding the mentioned problem of known pen-shaped computer mice.

The grip element can have an arbitrary form and shape to suit different users and applications. The grip element can for example be T-, or bowl-shaped, or have an elongated shape. Grip elements especially designed for the relevant application will of course be ergonomically advantageous.

According to one embodiment of the invention the grip element is an elongated, pen-shaped element. The connection axis of the pen-shaped grip element is its longitudinal axis. The action of moving the base element over the support surface by using the pen-shaped grip element will resemble the action of writing. During normal writing with a pen on a paper, the point of action of the forces applied by the user is on the paper, i.e. on a support surface. Therefore operating the input device according to the invention has an increased resemblance to writing because of the set back point of connection of the pen-shaped grip element moving the point of action closer to the support surface. Since the writing muscles are often used for high precision work, the user will find it easier to perform such work with the device according to the invention. In addition, the user will also experience increased ergonomics due to the possibility to find a comfortable writing position.

According to one embodiment of the invention, the base element has a housing constituting the outer shape of the base element. Other embodiments, where the base element constitutes an open frame work are though also possible. The base element can have an arbitrary shape, preferably adapted to the relevant application.

According to one embodiment of the invention having a housing, the recess is provided centrally on top of the base element in the housing. Normally, the area of the recess will constitute a minor part of the top surface of the housing.

According to another embodiment of the invention having a housing, the recess is provided in one of the side surfaces of the housing.

According to one embodiment of the invention, the inclination of the grip element relative to the support surface is limited. This is especially advantageous during work involving other steps than entering information to a computer via the computer input device according to the invention, since it is ensured that the grip element is always readily at hand. Normally, the maximal inclination of grip element relative a direction which is normal to the support surface is at least 10° and at the most 70°.

The inclination limiting feature may be accomplished in many different ways. According to one embodiment of the invention, the recess is provided with a preferential support portion against which the grip element abuts in its end positions, which thereby are defined. According to one embodiment, the preferential support portion is substantially triangular. According to other embodiments, the preferential support portion is substantially square, rectangular, polygonal or even round.

According to another embodiment, the grip element is provided with a surrounding, protruding support surface that abuts against a suitable part of the base element, thereby defining the end positions of the grip element.

According to one embodiment of the invention, the base element is provided with a joint in the recess for allowing the grip element to pivot round the two axes being orthogonal to the connection axis, but preventing rotation round the connection axis. Many different joints providing such pivot movement are known to the person skilled in the art, for example universal joints or special types of ball- and socket-joints.

According to one embodiment of the invention, the joint is an essentially frictionless joint. Furthermore, the grip element is not biased toward an upright position. Hereby the resemblance to writing is further increased and the effort needed to pivot the grip element is minimized. In an embodiment having arrangements for limiting the inclination of the grip element, the grip element will, due to gravity forces, automatically occupy one of the end positions when released by the user. Provided that the end positions are well designed, the grip element will wait ready for resumed use in a comfortable position.

According to one embodiment of the invention, the joint is comprised of two complementary parts, for example a ball part and a socket part, one part being provided on the grip element and the other part being provided on the base element. The point of connection of the grip element and the base element is in the joint.

According to one embodiment of the invention, the detecting means and the communication means are provided entirely in the base element. If a voltage source, for example batteries, are used as energy supply, the voltage source is then also provided entirely in the base element.

According to another embodiment, said detecting means, communication means and voltage source are provide entirely in the grip element. In this case the base element merely functions as a stand for the grip element providing the benefits of readiness and exact reference direction. In this case, the grip element may be a conventional pen mouse.

Of course, any allocation of the detecting means, the communication means, the voltage source or parts thereof between the base element and the grip element is included in the scope of protection of the present invention. In case electric mains is used as energy supply to the computer input device, parts of the energy source is located outside of the input device.

Also click buttons, scroll wheels, and the like may be provided on either one or both of the base element and the grip element.

According to one embodiment having the detecting means in the base element, the distance between the point of connection of the grip element and the detecting means is less than 20 mm, preferably less than 10 mm and most preferably less than 5 mm. The precision of the computer input device will increase the closer the point of connection of the grip element is to the detecting means.

According to one embodiment of the invention, the grip element is releasably connected with the base element. In that case, the grip element is provided with mechanical coupling means, mechanical locking means and, where applicable, with electrical and optical connection means, and the base element is provided with complementary mechanical coupling means and locking means and, where applicable, with complementary electrical and optical connection means being connectable to the corresponding means on the grip element.

According to one embodiment of the invention having a releasable grip element, the joint also constitutes the mechanical coupling means. Even the mechanical locking means may be incorporated in the joint. One example of such an embodiment has a joint comprised of two complementary parts, for example a ball part and a socket part, one part being provided on the grip element and the other part being provided on the base element.

A further advantage of having a two-part joint/mechanical coupling is a simplified manufacturing. If the joint/coupling has a relative simple shape, such as a ball-and-socket joint, the base element can be moulded in one or a few pieces. Thereby the assembly of the base element and computer input device is essentially simplified compared with the known device according to WO 01/01233.

According to a particular embodiment any electrical and optical coupling means and complementary coupling means are incorporated in the respective joint part. This is especially advantageous in an embodiment having a releasable grip element, since then the grip element can be coupled to the base element in one step.

According to one embodiment having a releasable grip element, a joint for the pivoting of the grip element is provided in the grip element. According to another embodiment, said joint is provided in the base element.

BRIEF DESCRIPTION OF THE DRAWINGS

The invention may be performed in various ways and, by way of example only, embodiments thereof will now be described in detail with reference being made to accompanying drawings, in which.

DESCRIPTION OF PREFERRED EMBODIMENTS OF THE INVENTION

Figure 1:
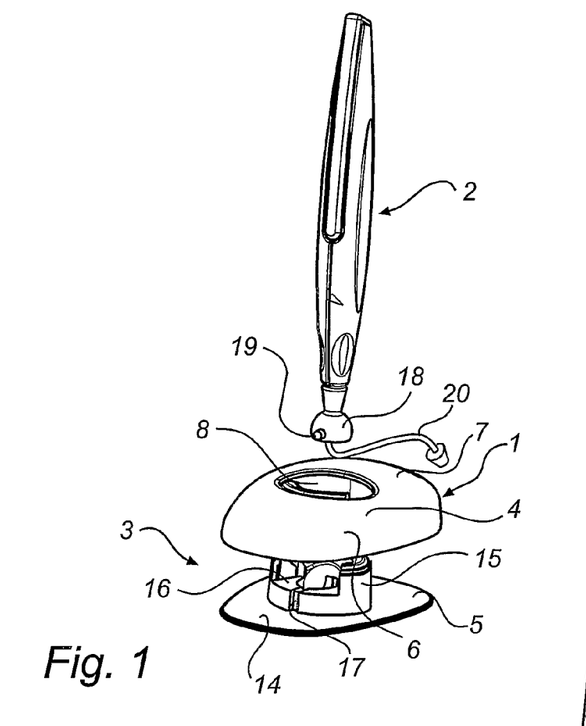
FIG. 1 is an exploded perspective view of a computer input device according to a first embodiment of the invention.

Referring to FIG. 1, a computer input device is shown comprising a base element 1 and a grip element 2 having a pen shape. The base element is arranged for being placed on a supporting, planar surface (not shown). In the following, the expressions "top", "upper", "bottom", "lower", "front", "back" or the like refer to the normal orientation of the computer device when placed on the support surface.

The base element 1 includes a housing 3 comprising a top part 4 and a bottom part 5. The top part 4 has an overall shape essentially as a conventional computer mouse. Inside the housing 3, the necessary (not shown) electrical and optical equipment, such as detecting means and communication means, are located.

The top part 4 has an essentially flat, slightly curved upper surface 7. Along its edges the surface 7 continuously transforms into a protruding side surface 6. Consequently, the top part 4 constitutes an open shell for covering the internal components of the computer input device.

Figure 2:
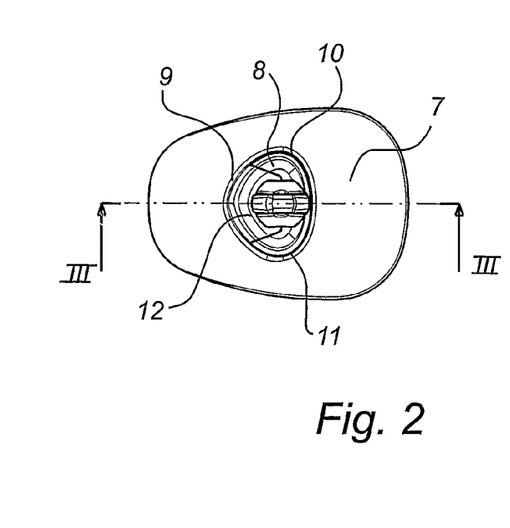
FIG. 2 is a plan view of the computer input device according to the first embodiment of the invention.

Furthermore, a recess 8 is provided in the upper surface 7 of the top part 4. As can be seen in FIG. 2, the rim of the recess has a rounded triangular shape, having a first rounded corner 9 pointing forward, a second rounded corner 10 pointing in one sideway direction and a third rounded corner 11 pointing in a second sideway direction. Between the rounded corners 9, 10, 11, the rim has rounded triangle sides.

Figure 3:
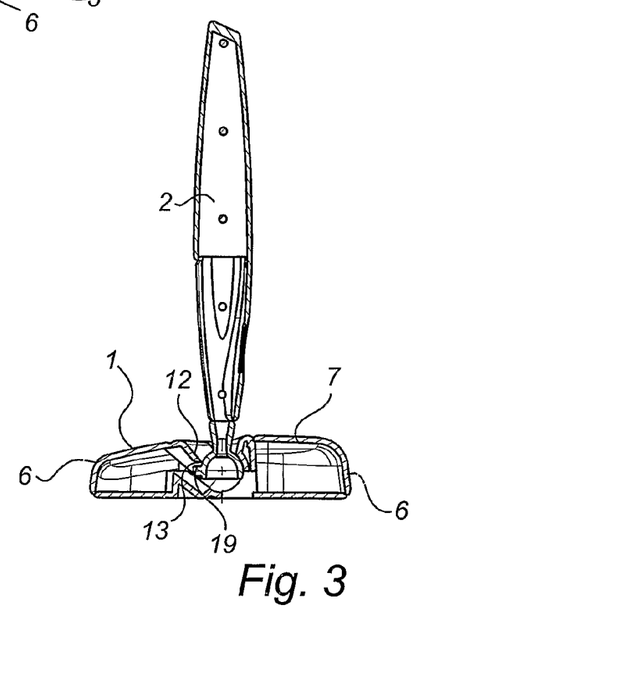
FIG. 3 is a sectional view of the computer input device according to the first embodiment of the invention, taken along lines III-III of FIG. 2.

The upper surface 7 is integral with a front recess wall 12 protruding from the top surface 7 into the recess. The front recess wall 12 is provided with a support portion, constituted by a lower edge 13, for locking the grip element 2 in the base element 1 (FIG. 3).

The bottom part 5 includes a bottom plate 14 for resting on the support surface. Centrally on the bottom plate 14, an essentially frictionless joint part in the form of a socket part 15 is provided. The socket part 15 has an opening 16 in its front portion. Below this opening 16 the socket part 15 is provided with a locking groove 17.

The pen shaped grip element 2 is provided with a ball part 18 of an essentially frictionless joint which is complementary to the socket part 15 of the base element 1. On the front portion of the ball part 18, there is a locking pin 19. The grip element 2 includes (not shown) electronic equipment, which are coupled to electrical connection means such as a plug 20.

This embodiment of the computer input device according to the invention is assembled in the following manner.

The pen shaped grip element 2 is placed in the bottom part 5 with its ball part 18 abutting against the socket part 15 and the plug 20 is connected in the base element 1. The locking pin 19 is inserted into the locking groove 17. Thereafter, the top part 4 is slipped over the grip element 2 by inserting the top portion of the grip element 2 in the recess 8. The front recess wall 12 is placed in the socket opening 16. Thereby, the socket 15 is completed. In addition, the opening of the locking groove 17 is closed by the lower edge 13 of the front recess wall 12. Finally, the top part 4 is secured to the bottom part 5. The grip element 2 is prevented from being separated from the base element 1 by its locking pin 19 being confined to the locking groove 17.

Thus, in the described embodiment, the joint also constitutes the mechanical coupling means. The lower edge 13 of the recess wall 12, thereby functions as mechanical locking means when the part 4 of the housing 3 is secured to the bottom housing part 5 by being resiliently fitted over the bottom part. Furthermore, the grip element 1 is prevented from rotating round its connection axis by the locking pin in the locking groove 17.

Figure 4A:
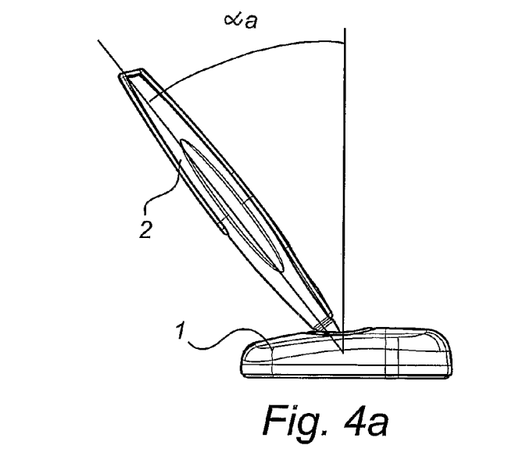
FIGS. 4a-4d are side views of the computer input device according to the first embodiment of the invention showing the maximum inclination of a grip element in different directions.
Figure 4B:
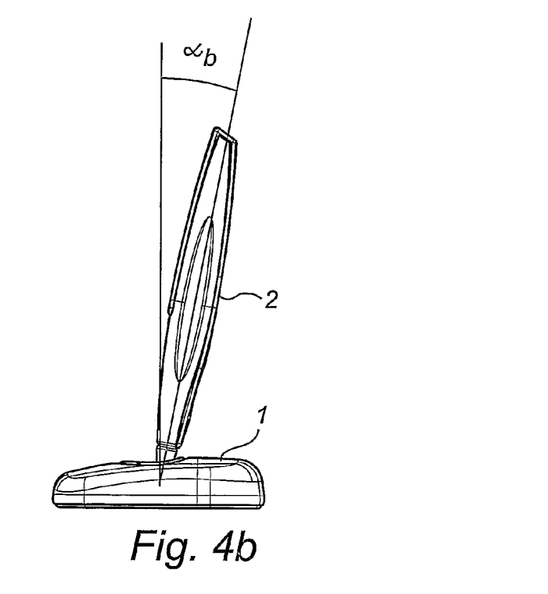
Figure 4C:
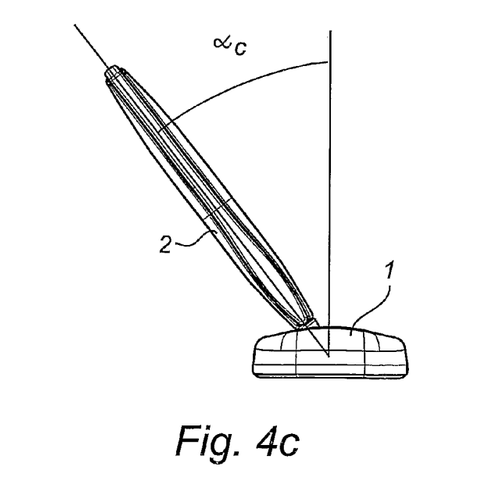
Figure 4D:
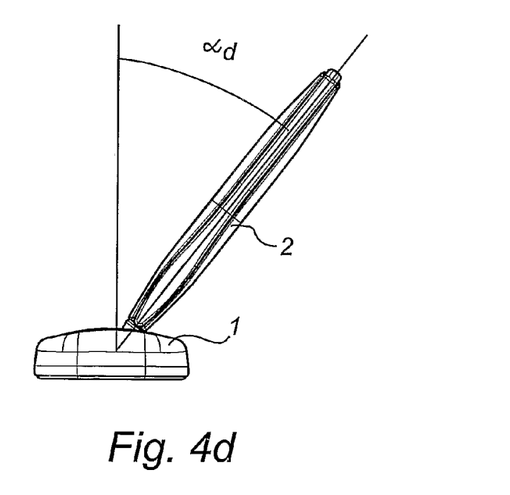

As best seen in FIGS. 4a-4d, the maximum inclination of the grip element relative to the direction normal to the support surface differs in different directions. The limitation of the inclination of the grip element 2 is achieved by the grip element 2 abutting against the rounded triangular rim of the recess 8. At the maximum inclination of the grip element 2 straight towards the user during normal use (FIG. 4a), the angle of inclination $\alpha_a$ is approximately 50°. In this position $\alpha$ has its largest value. At the maximum inclination of the grip element 2 in the sideway directions as shown in FIGS. 4c and 4d, the angle of inclination $\alpha_c$, $\alpha_d$ is approximately 45°. At the maximum inclination of the grip element 2 in the direction straight away from the user during normal use (FIG. 4b), the angle of inclination $\alpha_b$ is approximately 20°. In this position $\alpha$ has its smallest value. When the user lets go of the grip element 2, it will tip over until it abuts against the rim of the recess 8 and it will occupy an end position as a result of the nearly frictionless joint 15, 18. The values for a in the different directions are chosen on one hand to allow the grip element 2 to be inclined as much as normally desired by a user and on the other hand to let the grip element rest in a position in which it is easily accessible for the user.

Figure 5:
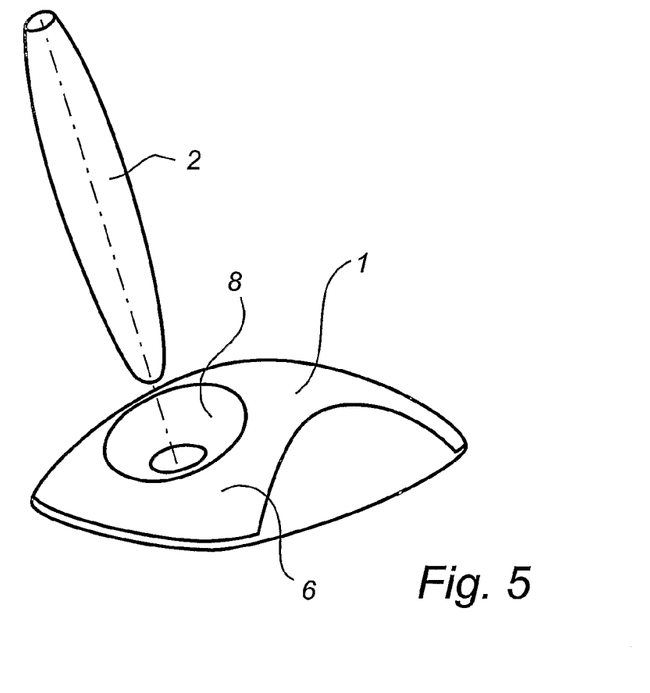
FIGS. 5 and 6 are schematic views of a computer input device according to the invention showing alternative locations for the grip element in the base element.
Figure 6:
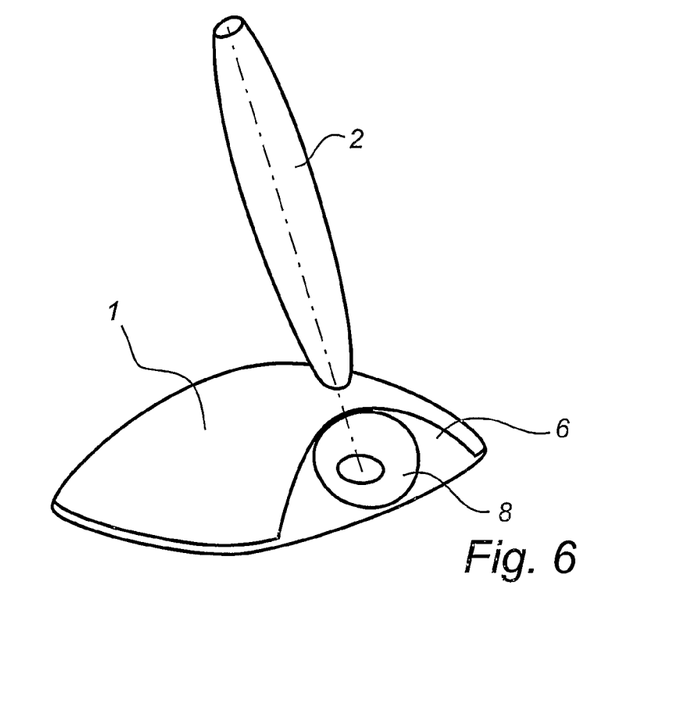

In FIGS. 5 and 6 schematic views of a computer input device according to the invention are shown, in which alternative locations for the grip element 2 in the base element 1 are indicated. In the embodiments according to FIGS. 5 and 6, the grip element is located in a recess 8 in the side surface 6 of the base element 1. In the embodiment according to FIG. 5, the recess 8 is located in a part of side surface 6 that faces the user during normal use. In this embodiment, the grip element 2 is especially easy to access. In the embodiment according to FIG. 6, the grip element is located in a part of side surface 6 that faces in a sideway direction of the user during normal use.

Figure 7:
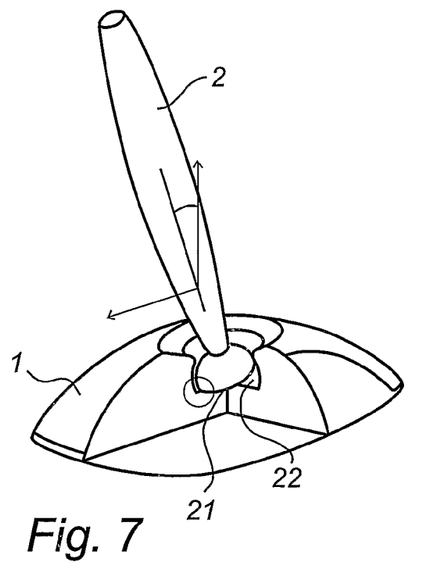
FIGS. 7-9 are schematic views of a computer input device according to the invention showing alternative solutions for limiting the inclination of the grip element relative to the support surface.
Figure 8:
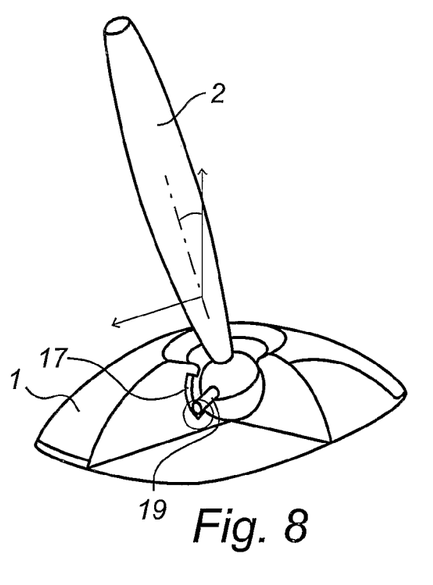
Figure 9:
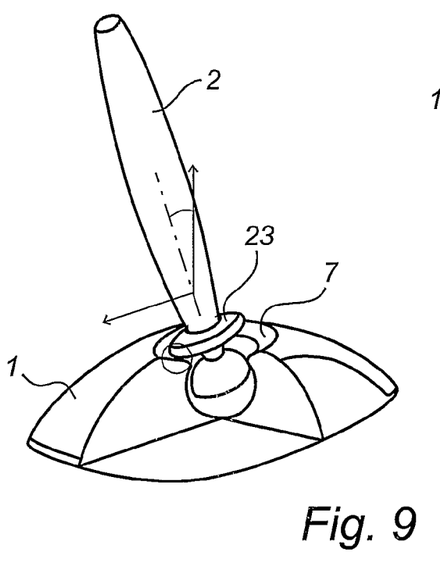

In the FIGS. 7-9, further embodiments of a computer input device according to the invention are shown. The embodiments differ from the embodiment described with reference to FIGS. 1-4 only in that they have other means for limiting the inclination of the grip element 2 relative to the support surface.

In the embodiment according to FIG. 7, the ball part 18 of the joint at the grip element 2 is provided with an edge 21. The socket part 16 is provided with a support surface 22. The limitation of the inclination of the grip element 2 is achieved by the edge 21 abutting against the support surface 22. Thereby, the shape of the support surface 22 is chosen to give the desired values for $\alpha$ in the end positions of the grip element 2. Alternatively, a planar support surface 22 can be used while selecting a proper shape of the edge 21.

In FIG. 8, the inclination of the grip element 2 round a lateral axis is limited by the locking pin 19 abutting against the ends of the locking groove 17. In other directions, the inclination is limited by the grip element 2 abutting against the rim of the recess 8.

In the embodiment according to FIG. 9, the grip element is provided with a flange 23. The limitation of the inclination of the grip element 2 is achieved by the flange 23 abutting against the upper surface 7 of the base element. Thereby, the dimensions of the flange 23 are chosen to match the desired end positions. Instead of the flange 23, a ball shaped element may be used.

Figure 10:
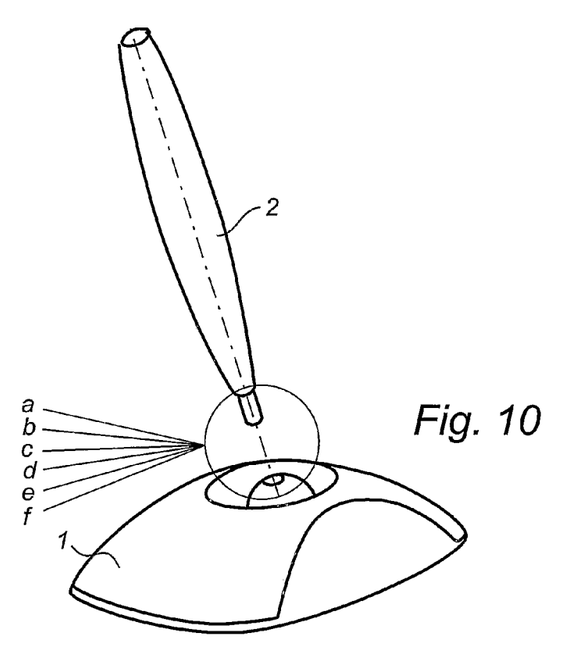
FIGS. 10 and 11 are schematic views of a computer input device according to the invention showing alternative locations for mechanical coupling means for connecting the grip element to the base element.
Figure 11:
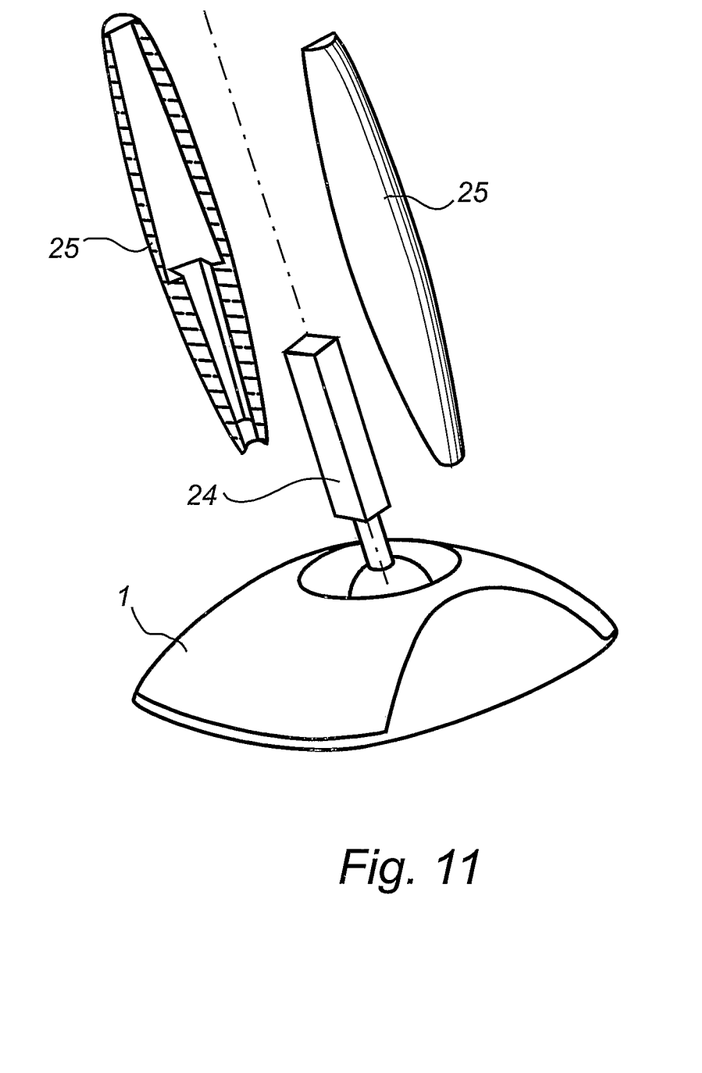
Figure 12A:
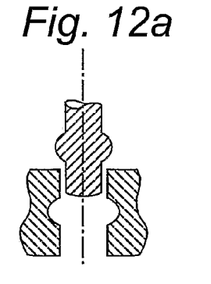
FIG. 12a-f are schematic views showing examples of the mechanical coupling means for use in a computer input device according to the invention.
Figure 12B:
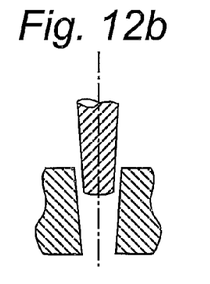
Figure 12C:
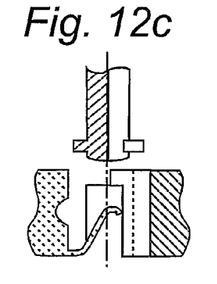
Figure 12D:
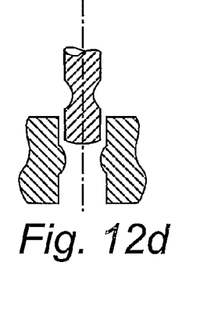
Figure 12E:
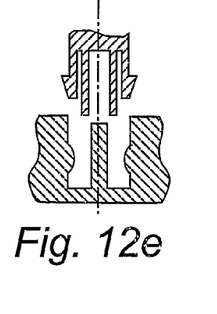
Figure 12F:
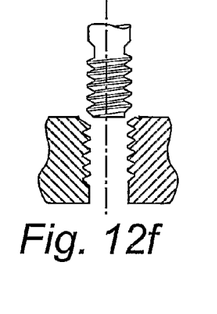

In FIGS. 10 and 11 embodiments of the computer input device according to the invention are shown, having a releasable grip element 2. Furthermore, the embodiments all include separate mechanical coupling means for the connection of the grip element to the base element, i.e. the mechanical coupling means are not included in the joint as is the case in the embodiment described with reference to FIGS. 1-4. The remaining features are though the same and will not be further described.

In the embodiment according to FIG. 10, the entire joint is located in the base element 1. The joint is provided with a first part of a mechanical coupling means. The grip element 2 is provided with a second part of a mechanical coupling means which is complementary to the first part of the mechanical coupling means.

In FIG. 12 examples of suitable mechanical coupling means are shown. These all also mechanically lock the grip element 2 to the base element 1. In FIG. 12, there is shown from left to right, a snap coupling, a clamp coupling, a bayonet coupling, an inverted snap coupling, a resilient snap coupling and a screw coupling.

In FIG. 11, an embodiment is shown, where the detecting means, the communication means, the energy source and the entire joint is located in the base element 1. The joint is provided with a protruding element 24. The grip element constitutes of two interconnectable shell parts 25, which may be secured to the protruding element 24. This embodiment has the advantage that many differently designed grip elements can be cost efficiently manufactured. Any suitably number of shell parts may of course be used for the grip element 2.

Figure 13A:
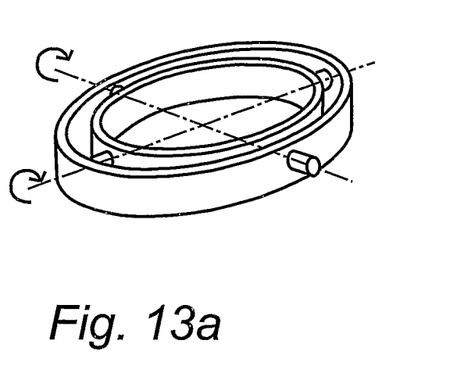
FIG. 13a-c are schematic views showing examples of a joint for use in a computer input device according to the invention.
Figure 13B:
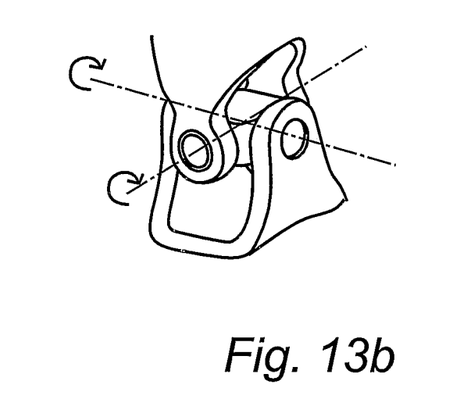
Figure 13C:
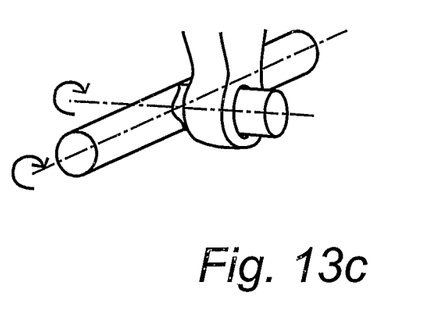

In FIGS. 13a-c alternatives to the ball-and-socket joint described with reference to the embodiment according to FIGS. 1-4 are shown. These alternative joints allow rotation round two axes and prevent rotation round one axis, i.e. the connection axis of the grip element 2. There is shown a universal joint of ring type (FIG. 13a), a universal joint (FIG. 13c) and a universal joint of cross pin type (FIG. 13b).

The invention claimed is:

1. A computer input device, comprising:
    a base element, arranged to rest on a surface;
    detecting means for detecting movement of the base element relative to the surface;
    communication means for communicating information about the detected movement to a computer;
    a grip element, connected to the base element in a direction of a connection axis; wherein
        the base element includes a recess having a circumferential support portion,
        the grip element extends into the recess,
        the grip element is pivotably arranged relative to the base element and prevented from rotating relative to the base element around the connection axis of the grip element, and
        the circumferential support portion is configured such that the grip element abuts against the circumferential support portion in an end position, an inclination of the grip element relative to the surface is limited, and such that the grip element remains in the end position if released and is accessible from the end position.

2. A computer input device according to claim 1, wherein the base element has a housing in which the recess is provided.

3. A computer input device according to claim 2, wherein the recess is provided centrally in a part of the housing that is facing away from the surface during normal use.

4. A computer input device according to claim 2, wherein the grip element includes a support portion for limiting, in cooperation with the housing, the inclination of the grip element.

5. A computer input device according to claim 2, wherein the housing is integral with the recess walls and one part of the joint.

6. A computer input device according to claim 1, wherein the circumferential support portion limits, in cooperation with the grip element, the inclination of the grip element.

7. A computer input device according to claim 1, wherein the recess has an essentially rounded triangular rim.

8. A computer input device according to claim 1, wherein the grip element is pivotably arranged by a joint provided in the recess.

9. A computer input device according to claim 8, wherein the joint is an essentially frictionless joint.

10. A computer input device according to claim 8, wherein the joint is a ball-and-socket joint.

11. A computer input device according to claim 10, wherein the ball part of the joint is provided with a locking pin and wherein the socket part of the joint is provided with a locking groove for receiving the locking pin.

12. A computer input device according to claim 8, wherein the detecting means is provided adjacent to the joint in the base element.

13. A computer input device according to claim 1, wherein the grip element is an elongated element, and wherein the connection axis is the longitudinal axis of the grip element.

14. A computer input device according to claim 1, wherein the grip element is releasably connected to the base element.

15. A computer input device according to claim 1, wherein the detecting means and the communication means are provided in the base element.

16. A computer input device according to claim 1, wherein the detecting means and the communication means are provided in the grip element.

17. A computer input device according to claim 1, wherein the grip element is an elongated pen shaped element, and wherein the connection axis is the longitudinal axis of the grip element.

18. The computer input device of claim 1, wherein the base element further comprises:
a housing including the recess; wherein
the movement of the base element over the surface is controllable by the grip element.

19. A base element, arranged for resting on a surface and connectable to a grip element to form a computer input device in conjunction therewith, wherein the base element is provided with a recess adapted for receiving the grip element pivotably therein, such that the grip element is prevented from rotating relative to the base element around a connection axis of the grip element, the recess having a circumferential support portion configured such that the grip element abuts against the circumferential support portion in an end position, an inclination of the grip element relative to the surface is limited, and such that the grip element remains in the end position if released and is accessible from the end position.

20. A base element according to claim 19, including a housing in which the recess is provided.

21. A base element according to claim 20, wherein the recess is provided centrally in the part of the housing that is most distal from the surface.

22. A base element according to claim 19, wherein the circumferential support portion limits, in cooperation with the grip element, the inclination of the grip element.

23. A base element according to claim 19, wherein the recess has an essentially rounded triangular rim.

24. A base element according to claim 19, wherein a joint for the pivotable reception of the grip element is provided in the recess.

25. A base element according to claim 24, wherein the joint is an essentially frictionless joint.

26. A base element according to claim 19, wherein the recess is adapted for receiving the grip element pivotably therein by being provided with a joint part, which joint part is adapted to be connectable to a complementary joint part on the grip element.

27. A base element according to claim 26, wherein the joint part is an essentially frictionless joint part.

28. A base element according to claim 26, wherein the joint part is a socket part of a ball-and-socket joint.

29. A base element according to claim 28, wherein the socket part is provided with a locking groove adapted for receiving a locking pin on joint part on the grip element.

30. A base element according to claim 26, wherein the base element includes detecting means for detecting displacement of the base element relative to the surface, wherein the detecting means are provided close to the joint part.

31. A base element according to claim 19, wherein the housing is integral with the recess walls and the joint part.

32. A base element according to claim 19, wherein the base element is adapted for being releasably connected to the grip element.

33. A base element according to claim 19, wherein the base element includes detecting means for detecting displacement of the base element relative to the surface.

34. A base element according to claim 19, wherein the base element includes communication means for communicating information about the displacement to a computer.

35. The base element of claim 19, further comprising:
a housing including the recess; wherein
movement of the base element over the surface is controllable by the grip element, and
the grip element extends into the recess.

36. A computer input device, comprising:
a base element, arranged to rest on a surface;
a detector configured to detect movement of the base element relative to the surface;
a communication link configured to communicate information about the detected movement to a computer;
a grip element, connected to the base element in a direction of a connection axis; wherein
the base element includes a recess having a circumferential support portion,
the grip element extends into the recess,
the grip element is pivotably arranged relative to the base element and prevented from rotating relative to the base element around the connection axis of the grip element, and
the circumferential support portion is configured such that the grip element abuts against the circumferential support portion in an end position, an inclination of the grip element relative to the surface is limited, and such that the grip element remains in the end position if released and is accessible from the end position.

* * * * *